United States Patent [19]

Blyler, Jr. et al.

[11] Patent Number: 5,046,800
[45] Date of Patent: Sep. 10, 1991

[54] ARTICLE COMPRISING A PASSIVE OPTICAL WAVEGUIDE

[75] Inventors: Lee L. Blyler, Jr., Basking Ridge; Edwin A. Chandross; Leonard G. Cohen, both of Berkeley Heights; Louis T. Manzione, Summit, all of N.J.

[73] Assignee: AT&T Bell Laboratories, Murray Hill, N.J.

[21] Appl. No.: 594,775

[22] Filed: Oct. 9, 1990

[51] Int. Cl.⁵ .................. G02B 6/10; B29D 11/00; C08F 120/18
[52] U.S. Cl. .................. 385/131; 385/14; 385/45; 385/143; 385/145; 264/1.7; 264/2.7; 526/329.7
[58] Field of Search ............ 350/96.11, 96.12, 96.13, 350/96.14, 96.15, 96.17, 96.30, 96.34, 320; 264/1.1, 1.4, 1.5, 1.7, 2.2, 2.7; 526/329.7

[56] References Cited

U.S. PATENT DOCUMENTS

| | | | |
|---|---|---|---|
| 3,993,485 | 11/1976 | Chandross et al. | 350/96.34 X |
| 4,072,399 | 2/1978 | Love | 350/96.16 |
| 4,552,431 | 11/1985 | Allemand et al. | 350/96.34 |
| 4,609,252 | 9/1986 | Wong et al. | 350/96.12 |
| 4,712,854 | 12/1987 | Mikami et al. | 350/96.12 |
| 4,733,093 | 3/1988 | Graves et al. | 250/551 |
| 4,749,245 | 6/1988 | Kawatsuki et al. | 350/96.12 |
| 4,762,382 | 8/1988 | Husain et al. | 350/96.12 |
| 4,824,522 | 4/1989 | Baker et al. | 350/96.12 X |
| 4,838,634 | 6/1989 | Bennion et al. | 350/96.12 |
| 4,871,487 | 10/1989 | Laursen et al. | 264/1.5 |
| 4,878,727 | 11/1989 | Boiarski et al. | 350/96.17 |
| 4,902,086 | 2/1990 | Henry et al. | 350/96.12 |
| 4,904,037 | 2/1990 | Imoto et al. | 350/96.12 |

OTHER PUBLICATIONS

*J. Applied Physics,* vol. 45, No. 10, Oct. 1974, "Submicrometer Resolution Replication of Relief Patterns for Integrated Optics," by G. D. Aumiller et al., pp. 4557-4562.
*Bell System Tech. Journal,* 53, 1974, "Slab-Coupled Waveguides," by E. A. J. Marcatili, pp. 645-674.
*Applied Optics,* vol. 19, No. 18, Sep. 15, 1980, "Polymer Optical Circuits for Multimode Optical Fiber Systems," by T. Kurokawa et al., pp. 3124-3129.
*J. Lightwave Technol.,* vol. 7, No. 10, Oct. 1989, "Low Loss Channel Waveguides in Polymers," by B. L. Booth, pp. 1445-1453.

*Primary Examiner*—Brian Healy
*Attorney, Agent, or Firm*—M. I. Finston; E. E. Pacher

[57] ABSTRACT

Disclosed is a planar optical waveguide that is manufacturable by the compression molding or embossing of a multilayer film of polymeric material. In one embodiment, the waveguide comprises a core layer of relatively high refractive index included between cladding layers of lower refractive index. The waveguiding channels are bounded by regions where the cladding layers are in contact and from which core material has been excluded.

8 Claims, 3 Drawing Sheets

ARTICLE COMPRISING A PASSIVE OPTICAL WAVEGUIDE

FIELD OF THE INVENTION

The invention relates to the field of passive optical waveguides, and more particularly to such waveguides made from polymeric materials.

BACKGROUND OF THE INVENTION

The field of optical telecommunication comprises both long-haul and short-distance applications. Long-haul applications involve transmission over relatively long distances, relatively high bandwidths, and relatively little branching of signals into separate channels. For such applications, fiber optics has generally been regarded as the most suitable technology for transmission and distribution of signals because it offers low loss and high bandwidth. By contrast, short-distance applications, such as loop networks and local area networks, typically involve transmission over short distances and branching of signals into many separate channels. For such applications, the cost of optical components is generally a significant factor, whereas loss and bandwidth are typically less significant relative to long-haul transmission.

Furthermore, single-mode transmission is currently favored for long-haul transmission because of its low pulse dispersion, but this requirement is relaxed in the case of short-distance transmission because pulse dispersion can be small over short distances. As a consequence, multimode transmission is a viable alternative for short-distance applications. Because multimode transmission channels generally have larger physical dimensions than single-mode channels, and manufacturing tolerances are consequently not as fine, a greater variety of materials and manufacturing methods are available for making short-distance components.

It has been suggested that at least some of these materials and methods have the potential of providing relatively inexpensive components that can be used in a commercially viable way to make short-distance networks that include many passive optical components such as splitters and combiners. Examples of such networks are loop networks and local area networks, as noted. Further examples are multipoint connections within signal processing machines such as computers and digital switches. Within such machines, it is proposed to have high-speed optical communication busses interconnecting many transmitters and receivers. In this regard, optical networks have been proposed for interconnecting circuit boards or even higher-level structures (such networks are referred to as "optical backplanes"), as well as for interconnecting individual chips on a single printed wiring board (PWB). Particularly for optical backplane and PWB applications, it is desirable to provide waveguides in the form of thin films that can be mounted on planar substrates such as those currently used for mounting electronic components.

Optical backplanes based on optical fibers have been proposed. Such backplanes frequently use fused fiber couplers, for example star couplers, for distributing signals. However, although they are useful, fused fiber star couplers are expensive. For example, in 1988 the cost of a typical 1×8 coupler was about 800 dollars.

Another approach based on optical fibers uses mixing rods to form splitters and combiners. Mixing rods are described, for example, in U.S. Pat. No. 4,072,399, issued to R. E. Love on Feb. 7, 1978. One embodiment of a mixing rod is an elongated cylinder of a material having an index of refraction matched to the cores of the fibers to be coupled, and clad with lower index material. The rod has polished endfaces oriented perpendicular to the longitudinal axis. The ends of optical fiber bundles are disposed adjacent to the endfaces. This approach is relatively inexpensive, although cost savings are reduced by the complexity of the assembly process. Furthermore, this approach is not easy to miniaturize or adapt to a planar geometry.

Various approaches have been taken to the formation of planar waveguide circuits from glass or polymeric material by photolithographic processing. Such an approach is discussed, for example, in U.S. Pat. No. 4,878,727, issued to A. A. Boiarski, et al. on Nov. 7, 1989. In yet another approach, notches are machined at designated coupling points in polymer waveguides for reflecting light into or out of the waveguide. This approach is described, for example, in U.S. Pat. No. 4,733,093, issued to A. F. Graves and E. A. Munter on Mar. 28, 1988. Although useful, all of these approaches involve time-consuming processing steps that add cost to the final product.

The fabrication of single-mode integrated optical devices using embossing or molding techniques was proposed, for example, in G. D. Aumiller, et al., "Submicrometer Resolution Replication of Relief Patterns for Integrated Optics;" *J. Appl. Phys*, Vol. 45, (1974) pp. 4557–4562. One method discussed in that work involved embossing grooves in PMMA substrates and subsequently filling the grooves with a photopolymer having a higher refractive index than the substrate. However, it appeared difficult to achieve the fine tolerances considered necessary to make a useful waveguide by such a technique.

Thus, practitioners in the field have until now sought, without success, a passive optical waveguide technology, capable of embodiment in automated or semi-automated manufacturing processes with low labor content and moderate capital expenses, making possible the production of low cost planar optical waveguides, and of articles that comprise such waveguides.

SUMMARY OF THE INVENTION

In a broad sense, the invention is an article which comprises a polymeric waveguiding film mounted on a substantially planar surface of a base member. The film comprises a layer of core material having a glass transition temperature $T_g$, and overlying the core layer, a layer of cladding material having a melting point $T_m$ or glass transition temperature $T_{g,clad}$ which is greater than $T_g$.

At least at a given wavelength, the refractive index of the core material is greater than the refractive index of the cladding material. As a consequence, the cladding material serves an optical waveguiding function, confining at least some electromagnetic radiation to the core layer.

The base member optionally includes a polymeric second cladding layer, which also has a melting point or glass transition temperature greater than $T_g$, mounted on a substantially planar surface of a substrate such that it underlies the core layer. At least at the given wavelength, the refractive index of the core material should also be greater than the refractive index of the material of the second cladding layer, such that this layer also serves an optical waveguiding function. If such a second cladding layer is not included, then, in any case, that portion of the substrate that underlies the core layer should have a refractive index (at least at the given wavelength) smaller than that of the core material, such that the portion serves an optical waveguiding function.

At least one waveguiding channel is defined in the film, extending substantially parallel to the surface of the base member and adapted for guiding electromagnetic radiation of the given wavelength. The channel comprises a core of core material having a substantially planar lower surface in contact with the surface of the base member. The waveguiding channel further comprises at least an upper cladding of cladding material overlying and at least partially surrounding the core, such that the core has an upper surface (which is typically a curved surface) in contact with the upper cladding. In at least a portion of the waveguiding channel, the core layer is constricted to a relatively small thickness (e.g., less than about 3.0 μm for a multimode channel), such that the upper cladding layer and base member together substantially completely surround the core and radiation of the given wavelength can be guided in the portion with a total mode loss, over the entire channel, of less than about 1 dB. Although at least in principle, the waveguiding channel may be either a multimode or a single mode channel, a currently preferred embodiment involves a multimode channel.

In an exemplary manufacturing process, a film comprising the core layer and upper cladding layer (and, optionally, a lower cladding layer) is heated to a temperature greater than $T_g$ but less than the $T_m$ (or $T_{g,clad}$) of the cladding layer or layers. A force is then applied to the film such that at least some core material is caused to flow out of at least one pair of elongate regions of the core layer and into adjacent regions of the core layer, such that the waveguiding channel is formed between the elongate regions. The force is applied, for example, by a die having a pattern of projections such that when the projections contact the film with an appropriate amount of pressure, core material flows out of the region beneath the projections. The film is then typically mounted on a substrate.

DETAILED DESCRIPTION

Figure 1:
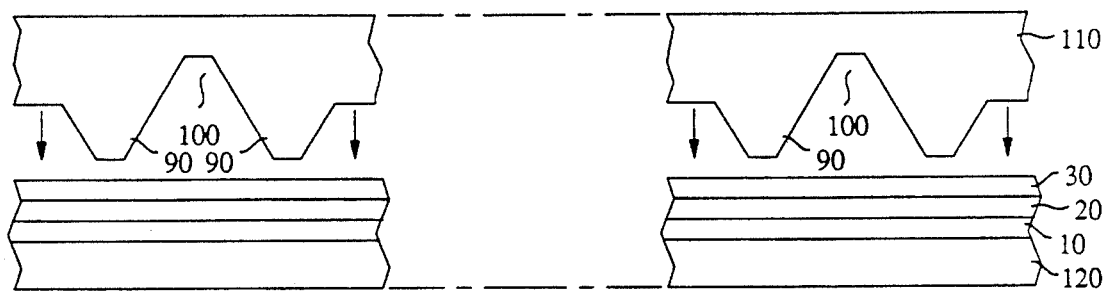
FIG. 1 schematically depicts an exemplary method for forming the inventive waveguide. The method involves applying a compression molding tool to a composite film.

With reference to FIG. 1, the waveguide, in a preferred embodiment, includes three layers of thermoplastic polymeric material: optional lower cladding layer 10, core layer 20, and upper cladding layer 30. There must be sufficient difference between the refractive index of the core layer and the refractive index (or indices) of the cladding layers to permit light to be guided in the core layer. (If a lower cladding layer is omitted, then a medium, e.g., air or a base member, having an appropriate refractive index must underlie core layer 20 at least when the waveguide is in use). For this purpose, it is desirable for the layers to exhibit a numerical aperture (NA) that is at least about 0.20, and that is preferably within about 20% of the NA of the fibers to be coupled. Lower NA is undesirable because of low light-coupling efficiency, and higher NA is undesirable because of the large optical losses incurred in coupling to a smaller NA fiber. In a currently preferred embodiment, both cladding layers consist of polyvinylidene fluoride (PVDF), which has a refractive index of about 1.42, and the core layer consists of poly(methyl methacrylate) (PMMA), which has a refractive index of about 1.49. The resulting NA is about 0.45.

In addition, each cladding material is desirably characterized by a melting point ($T_m$) or glass transition temperature ($T_{g,clad}$), and the core layer is desirably characterized by a glass transition temperature ($T_g$) that is lower than the melting point or glass transition temperature of either cladding layer. For example, PVDF has a $T_m$ of 167° C., and PMMA has a $T_g$ of 105° C.

Moreover, all of the materials selected for the three layers are desirably capable of adequate bonding to each other, preferably without any added adhesion promoter, at the processing temperature and pressure. Significantly, the processing temperature should be chosen to be intermediate between the cladding $T_m$ (or $T_{g,clad}$) and the core $T_g$.

Table 1 is an exemplary listing of thermoplastics that are readily available and can be used for making waveguides according to the invention. Cladding layers made from any of the first three materials listed may be combined with core layers made from any of the last four materials listed in the table. That is, the listed cladding materials are: perfluorinated ethylene-propylene copolymer (sold under the tradename Teflon TM FEP), poly(vinylidene fluoride) (PVDF), and poly (4-methylpentene-1) (sold under the tradename TPX), and the listed core materials are: polymethyl methacrylate (PMMA), styrene-acrylonitrile copolymer (SAN), polycarbonate, and polystyrene.

However, it should be noted that a PMMA core with TPX cladding may be undesirable because it has an NA of only about 0.24, and a polycarbonate core with a PVDF cladding may be undesirable because the respective values of $T_g$ and $T_m$ limit the possible process temperatures to the narrow range of 145°-167° C.

Moreover, it should be noted in this regard that the semicrystalline fluoropolymers FEP (perfluorinated ethylene-propylene copolymer) and PVDF have not conventionally been regarded as optical materials, because they have relatively high scattering losses. However, these materials also have relatively low refractive indices. As a consequence, they are useful as cladding materials, for which optical transparency requirements are less stringent than for core materials in high NA structures.

In addition to the polymers listed in the table, other polymers useful in this context can be made by mixing two or more distinct polymers to make a compound material of intermediate properties. For example, PMMA can be mixed with either PVDF or SAN (styrene-acrylonitrile copolymer) to make such a material. The mixture can be made either in solution or in the melt phase. Furthermore, those skilled in the art can readily identify other known polymers that may be used to make waveguides.

The initial thicknesses of the three layers can be determined by, for instance, reference to the dimensions of the fibers to be coupled to the planar waveguide. For example, to couple to a fiber having a 200-μm-diameter core and a 230-μm-diameter cladding, preferred thicknesses are: for the PMMA core, about 150 μm, and for the PVDF cladding layers, about 75 μm. These layer thicknesses are chosen to provide a waveguide region that has near-optimal coupling to the 200-μm core after the waveguide region has been formed by a properly sized forming tool.

Figure 2:
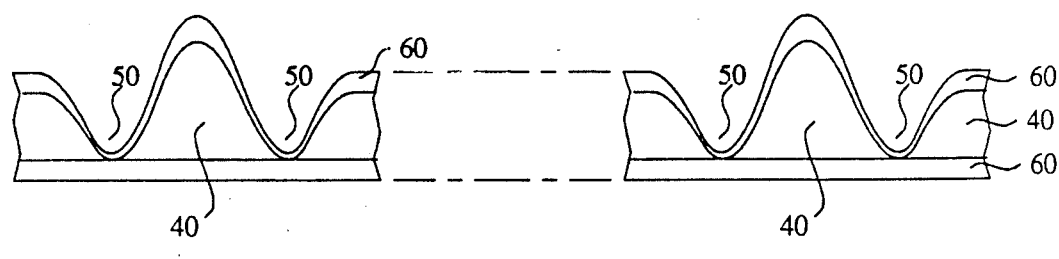
FIG. 2 is a schematic cross-sectional view of an exemplary waveguide formed by the process of FIG. 1.

After a waveguiding channel is formed, it typically has a cross-sectional profile as depicted, for example, in FIG. 2. The waveguiding core 40 has a basically triangular profile extending, in height, above the top of the core layer as it existed before the forming step. On either side of the core is a depression 50. Core material is substantially excluded from at least a portion of the depression, and in that portion, the upper and lower cladding layers are desirably substantially in direct contact, or at least in close proximity, with each other.

The core has an effective diameter which is defined as the diameter of a uniformly clad optical fiber having the same cross sectional core area and the same Δ. By "Δ" is meant the refractive index difference between the core and the cladding. The effective diameter required for a given application is readily calculated by one of ordinary skill in the art, and depends, in part, on whether a single-mode or multimode waveguide is desired. (A relevant, theoretical discussion of mode propagation appears in E. A. J. Marcatili, "Slab-Coupled Waveguides," *Bell System Technical Journal*, 53, (1974), pp. 645–674.) Typical effective diameters are 3–10 μm for single-mode, and 50–500 μm for multimode waveguides.

Core material that remains in the depression between the cladding layers is referred to as "flash". Flash may still remain even after a molded core region is removed from the forming tool. Too much flash material is undesirable because it may be able to provide optical leakage paths. That is, core modes may be coupled into flash material, resulting in optical loss from the waveguide and even in crosstalk between adjacent waveguides. Optical loss arising from coupling into flash material is referred to as "mode loss." It is desirable for total mode loss to be less than about 1 dB/cm, and still more desirable for it to be less than about 0.1 dB/cm.

In order for mode loss to be less than about 1 dB/cm in a multimode waveguiding channel, it is desirable for the thickness of the flash material to be less than about 3.0 μm. By way of illustration, a few theoretical calculations are here provided, representative of an exemplary multimode waveguide having an effective core diameter of 200 μm and a refractive index difference Δ between core and cladding of 0.02. The exemplary waveguide will theoretically have mode loss less than 1 dB/cm if the flash is less than about 2.8 μm thick. Because the mode loss is sensitive to Δ, the maximum allowable flash thickness (to have a mode loss less than 1 dB/cm) is about 3.5 μm at Δ=0.009, and is about 1.15 μm at Δ=0.09. Below 1 dB/cm, the mode loss typically falls very rapidly as the flash thickness is decreased. For example, in order to decrease the mode loss in the exemplary waveguide from about 1 dB/cm to about 0.1 dB/cm, a decrease in the flash thickness of about 20%–35% is typically required.

In order for mode loss to be less than about 1 dB/cm in a single-mode channel the flash thickness should be no greater than half the peak height of the core. (The peak height of the core, and that portion of the core that contributes to the effective diameter, should be measured from the top of the flash layer in region 50. The peak height of a single-mode core is generally less than about 10 μm.)

In the region of the depression, the upper cladding typically is thinner than the corresponding layer as it existed prior to channel formation, and the upper surface of the cladding in that region is typically lower than the top of the core, as formed, and also lower than the top of that portion of the core layer lying in shoulder region 60 external to the waveguiding channel.

It should be noted in this regard that during or after the forming step, the composite film may be divided to separate formed waveguides from each other or from unformed portions of the film. When the film is divided, at least a portion of each of shoulder regions 60 may be excluded from the film portion containing the waveguiding channel. Such a division may be effected by appropriate projections on the die, or by other appropriate means.

The width of the core is usefully described in terms of the separation between the centers of the two depressions bounding the core. This separation, and the height of the core, are advantageously chosen to minimize the cross-sectional area mismatch between the coupler core region and the cores of the optical fibers that are to be coupled. Thus, in order to couple to, e.g., a fiber having a 200 μm core diameter and a 230 μm cladding diameter, a currently preferred separation is about 500 μm, and a currently preferred height is about 250–300 μm.

After the waveguiding channel is formed, the thickness of the upper cladding layer generally varies across the depressions and the waveguiding region. The upper cladding layer is typically thinnest at or near the centers of the depressions. It is generally undesirable for the upper cladding layer to be less than 10 μm thick at any point, because if it were substantially thinner, it would be difficult to maintain its structural integrity. The layer thickness generally increases both toward the shoulder regions 60 and also toward the center of the waveguiding region. At the peak of the waveguiding region, the thickness of the upper cladding layer is typically the same as the original cladding thickness.

Ideally, the shape of the lower cladding layer does not need to be changed in the channel-formation process. However, in practice some change in shape typically occurs. Generally, the change is limited to the region of the depressions which bound the core, and involves formation of depressions in the lower cladding layer that are much shallower than depression 50.

It is generally required for the bottom of the lower cladding layer to be substantially planar, because typical applications involve mounting the waveguide on a planar substrate. For example, a large stamping die can be used to form an entire optical circuit pattern that is subsequently laminated to a substrate or printed wiring board. Lamination techniques are well known in the art and include, for example, application to the substrate with an adhesive.

Typically, multiple waveguides are formed side-by-side. During the formation (i.e., molding or embossing) step, core material may be left in the region beneath the projections, where the two cladding layers are pressed together, forming an optical leakage path between adjacent waveguides. As noted, such material is referred to as "flash" material. Flash is undesirable because it may lead to optical loss and to crosstalk between neighboring channels. Several properties of the invention (in a preferred embodiment) are intended to reduce the occurrence of flash. First, the thicknesses of the layers (prior to the formation step) are adapted to reduce the occurrence of flash. Second, the projections on the die create recesses in the film that run next to the waveguide channels. These recesses decrease the thickness of the flash material. Third, a combination of core material and processing temperature is chosen such that the core material during processing can flow to an effectively unlimited extent. As a consequence of the liquidity of the core material, such flash as occurs can be made very thin. Fourth, the widths of projections 90 are made relatively narrow to maximize the forming pressure, but still wide enough to provide mechanical robustness and relatively long tool life.

Figure 3:
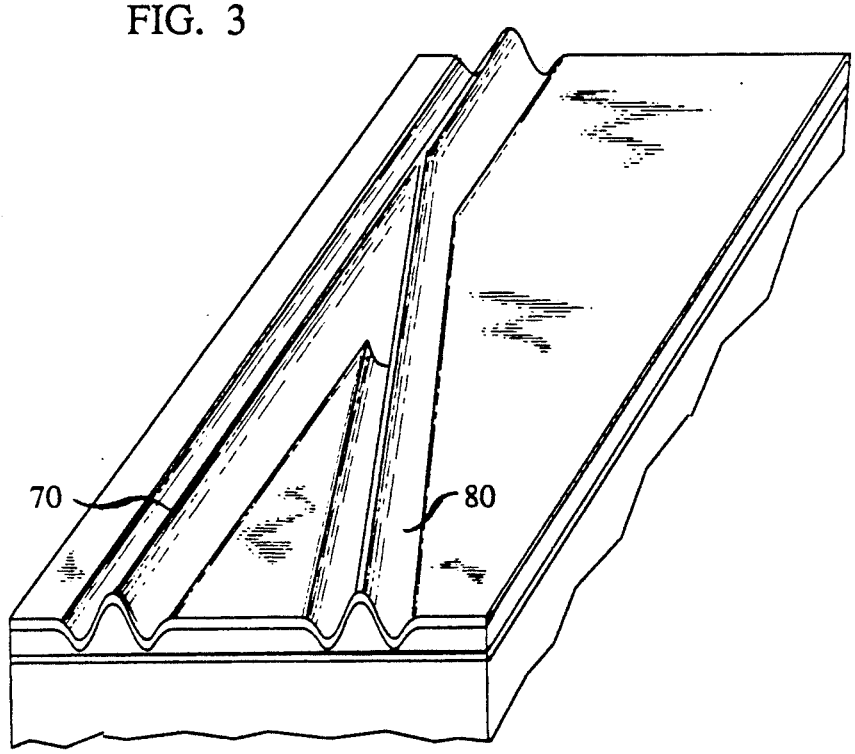
FIG. 3 is a schematic perspective view, not to scale, of an optical waveguide 2:1 splitter-combiner according to one embodiment of the invention.

Generally, the manufacturing processes for making the above-described simple waveguiding channels are also useful for making passive optical components such as splitter-combiners. As depicted, for example, in FIG. 3, a splitter-combiner can be made having a straight channel 70, and a side channel 80 deviating from the straight channel. Side channel 80 can diverge, for example, at an angle of 3.4° or 6.8°. Such designs are well known in the art in connection with photofabricated polymer waveguides, and are described, for example, in T. Kurokawa, et al., "Polymer Optical Circuits for Multimode Optical Fiber Systems," *Applied Optics*, 19", (1980) pp. 3124-3129, and in B. L. Booth, "Low-Loss Channel Waveguides in Polymers," *J. Lightwave Technol.* 7, (1989) pp. 1445-1453. Such components are readily made, for example, by appropriately configuring the projections 90 and recesses 100 of the working surface of a die 110, as shown in FIG. 1.

With reference to FIG. 1, an exemplary forming process includes the steps of assembling layers 10, 20, and 30 to form a composite film (not necessarily bonded together at this stage), aligning the film between a die 110 and an anvil or backplate 120, heating the film to a predetermined operating temperature, and applying a predetermined pressure between the die and the film for a predetermined time interval. The contacting surface of the die includes a pattern of projections that can deform the film such that one or more channels are defined. The die may be moveable in a vertical direction, resulting in an operation similar to stamping (such an operation is here called "molding"), or, alternatively, the die may be a rotating drum, resulting in an embossing operation. The operating temperature should be greater than the $T_g$ of the core layer but less than the $T_m$ or $T_{g,clad}$ of either of the cladding layers. As a consequence, the core layer typically behaves as a viscous liquid while the cladding layers behave as ductile solids which, although softened, are still relatively resistant to flow. The pressure should be great enough to form the depressions 50 of FIG. 2 but not so great as to force substantial amounts of core material from the edges of the composite film, or force the projections 90 to cut through the top cladding film. The time interval should be long enough to permit the desired deformation of the cladding layers to occur and to permit the core material to flow out of the depressions to a sufficient extent to substantially eliminate the problems caused by flash. In the formation of 2:1 splitter/combiners in the exemplary film, consisting of upper and lower cladding layers of 75-μm-thick PVDF and a core layer of 150-μm-thick PMMA, a typical temperature is about 150° C., a typical pressure is in the range 360-670 psi, and a typical time interval is about 2 minutes. The amount of flash tends to decrease as the compression time is increased, but no significant improvement is observed for compression times greater than a few minutes.

Machining techniques for forming the die are desirably capable of forming features as small as about 100 μm in extent. Several different machining techniques of sufficient resolution are known in the art.

For example, lithography and etching can be used to create 200 μm channels having complicated geometries. However, this method may be disadvantageous because it generally creates relatively rough surfaces in the channels, and the release of the plastic part from the etched channel could be difficult because the channel might not have adequate draft angle, and the plastic could be fairly well bonded to the rough surface.

As another example, electric discharge machining (EDM), which is well known in the art, can be used to make straight channels of appropriate size, having satisfactory surface finish. However, the preferred EDM technique, wire EDM, generally cannot be used to make non-linear features such as branches in splitter/combiners.

Microplaning, using microblades 1-2 mils wide, can be used to plane metals to very high precision with an optical surface finish. However, this method is generally limited to use with special alloys and is generally extremely slow.

The currently preferred method involves the use of a custom cutting tool made by grinding the tip of a metal rod to create several sharpened cutting surfaces. The tool is both rotated and translated to cut channels in the surface of the die. Both aluminum and steel forming dies can be cut by this method. However, channels cut by this method are generally limited to channels having triangular or trapezoidal cross section.

This method is also well known in the art, although it is not conventional to use it to form features having dimensions as small as those that are desirable for purposes of the invention, i.e., features less than about 200 μm in extent, and preferably, features as small as about 100 μm in extent. However, we have found that such desirably small features can be machined in standard grade metals. This method is advantageous because it is relatively rapid and inexpensive, can provide satisfactory quality, and is flexible enough to make designs that are of current commercial interest.

After the channels are cut with the custom cutting tool, the die is subjected to mechanical polishing and manual polishing to produce a nearly optical surface finish.

EXAMPLE

Several multimode 2:1 splitter-combiners were made by compression molding using an aluminum die that in turn was made using a custom cutting tool, as described above. The splitter-combiners were made from two PVDF cladding layers and a PMMA core layer, as described above. The composite film was heated and maintained at 150° C., and during the forming step, was subjected to a constant pressure that was varied from 360 to 670 psi among the set of splitter-combiners fabricated. In each splitter-combiner, the channel cross section was 500 μm wide, as measured between the centers of the depressions, and the peak height of the core, as formed, was about 550 μm. Each splitter-combiner consisted of a straight channel and a side channel diverging from the straight channel at an angle of 3.4° as shown (with exaggerated angle) in FIG. 3. About 30% of the launched light was tapped into the side channel.

Figure 4:
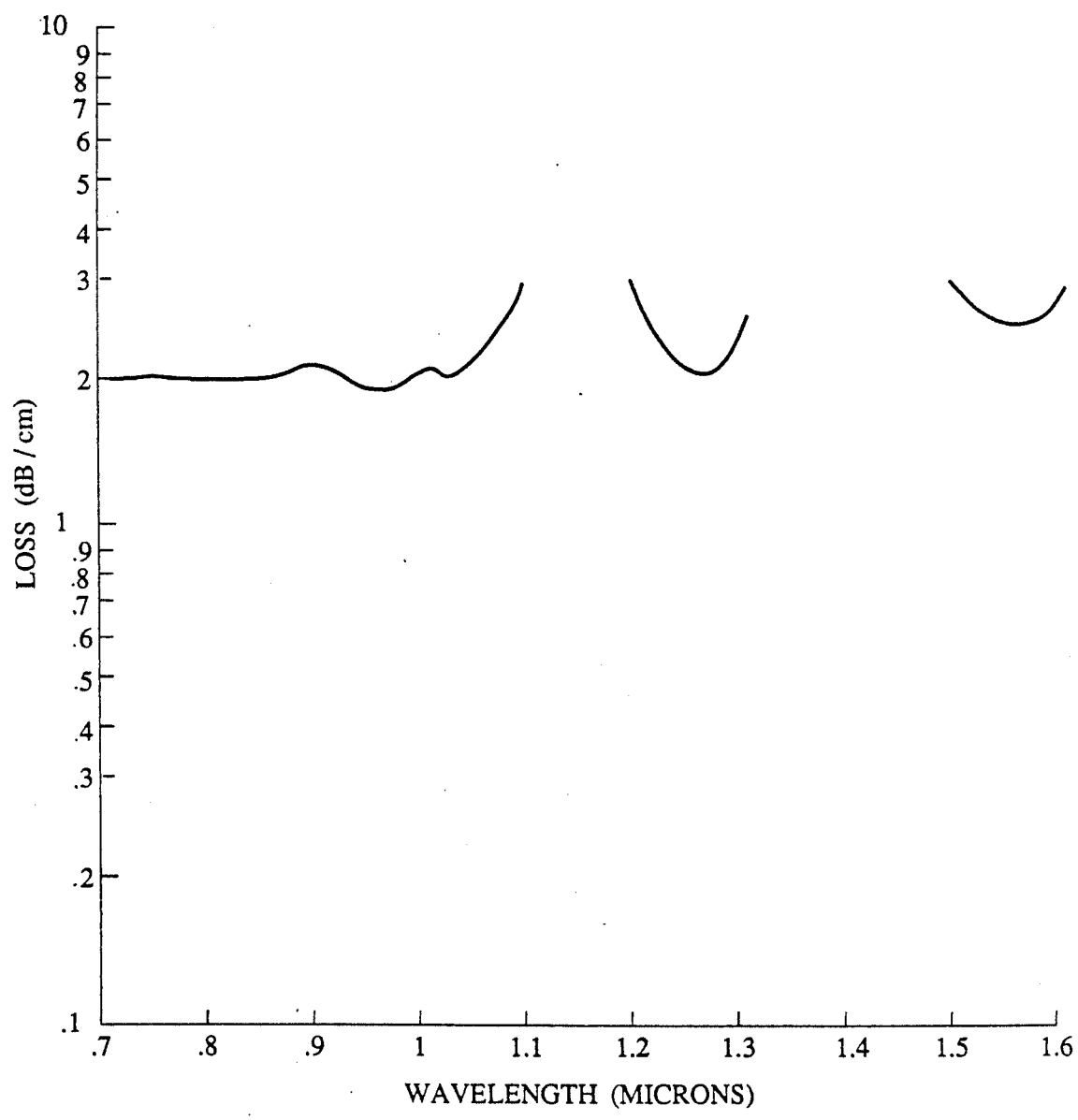
FIG. 4 is an optical loss spectrum of an exemplary splitter-combiner.

FIG. 4 is a loss spectrum measured for a selected splitter-combiner from the batch. Light was butt-coupled into the splitter-combiner from an optical fiber using an index matching liquid. As is apparent from the figure, the loss ranged from about 2 dB/cm to about 5 dB/cm over the wavelength range 0.7–1.6 μm. The spectrum appears discontinuous because two absorption peaks at about 1.17 μm and about 1.4 μm, respectively, are not shown. The measurement that is represented in the figure is of total insertion loss, including coupling losses into and out of the waveguide. No effort was made to exclude dust during fabrication, and a large portion of the measured attenuation is probably attributable to scattering from dust.

TABLE 1

Thermoplastics for Optical Couplers

| Polymer | Refractive Index $n_D$ | $T_g$ (°C.) | $T_m$ (°C.) |
| --- | --- | --- | --- |
| Teflon ® FEP | 1.33 | — | 262 |
| PVDF | 1.42 | — | 167 |
| TPX | 1.47 | — | 240 |
| PMMA | 1.49 | 105 | — |
| SAN | 1.57 | 100 | — |
| Polycarbonate | 1.59 | 145 | — |
| Polystyrene | 1.59 | 100 | — |

We claim:

1. An article, comprising:
    a base member having a substantially planar surface; and
    a polymer film on the surface, the film comprising an elongate first region extending in a direction substantially parallel to the surface and adapted for guiding electromagnetic radiation of a given wavelength, the region to be termed the "first waveguiding channel";
    characterized in that
    the film comprises first and second polymeric materials, the former having a higher refractive index than the latter at the given wavelength;
    the first polymeric material has a glass transition temperature $T_g$ and the second polymeric material has a melting point or glass transition temperature that is higher than $T_g$;
    the first waveguiding channel comprises a core of first polymeric material and a cladding of second polymeric material, the cladding overlying and at least partially surrounding the core;
    the core has a substantially planar lower surface in contact with the base-member surface, and an upper surface in contact with the cladding; and
    in at least a portion of the first waveguiding channel, the upper core surface approaches the lower core surface within a distance such that radiation of the given wavelength can be guided in the portion with less than about 1 dB of mode loss.

2. The article of claim 1, wherein:
    the base member comprises a substrate having a substantially planar surface, and a lower cladding film of a third polymeric material having a melting point or glass transition temperature greater than $T_g$ and a refractive index that is less than the refractive index of the first polymeric material, the lower cladding film being disposed on the substrate surface.

3. The article of claim 1, wherein the polymer film further comprises a second region comprising a first polymer layer of substantially constant thickness, with a second polymer layer of substantially constant thickness disposed thereon.

4. The article of claim 2, wherein:
    (a) the first polymeric material is selected from the group consisting of: poly(methyl methacrylate), styrene-acrylonitrile copolymer, polycarbonate, and polystyrene; and
    (b) the second and third polymeric materials are each selected from the group consisting of: perfluorinated ethylene-propylene copolymer, poly(vinylidene fluoride), and poly(4-methylpentene-1).

5. The article of claim 1, wherein the core has an effective diameter of at least about 50 μm but not more than about 500 μm, and in at least a portion of the waveguiding channel, the upper core surface approaches the lower core surface within a distance less than about 3 μm, such that multimode radiation can be guided in the portion.

6. The article of claim 1, further comprising at least a second waveguiding channel of the same type as the first waveguiding channel, the second channel optically coupled to the first channel such that a portion of electromagnetic radiation of the given wavelength injected into the first channel can enter and be guided in the second channel.

7. The article of claim 6, comprising a 2:1 optical splitter-combiner.

8. A method for forming a waveguide in a polymeric film, comprising the step of shaping the film such that at least one waveguiding channel is defined in the film, characterized in that
    the film comprises a core layer comprising a first polymeric material having a glass transition temperature $T_g$ and a first refractive index;
    the film further comprises an upper cladding layer overlying the core layer, the upper cladding layer comprising a second polymeric material having a melting point or glass transition temperature that is greater than $T_g$ and a second refractive index that is smaller than the first refractive index;
    the method further comprises, before or during the shaping step, the step of heating the film to a temperature that is greater than $T_g$ but less than the melting point or glass transition temperature of the upper cladding layer; and
    the shaping step comprises applying a force to the heated film such that at least some first polymeric material is caused to flow out of at least one pair of elongate regions of the core layer and into adjacent regions of the core layer, such that the waveguiding channel is formed between the elongate regions.

* * * * *